March 29, 1960 W. TAYLOR 2,930,972
APPARATUS FOR DETECTING DISCONTINUITIES
IN FERROUS MATERIALS
Filed Dec. 3, 1956 2 Sheets-Sheet 1
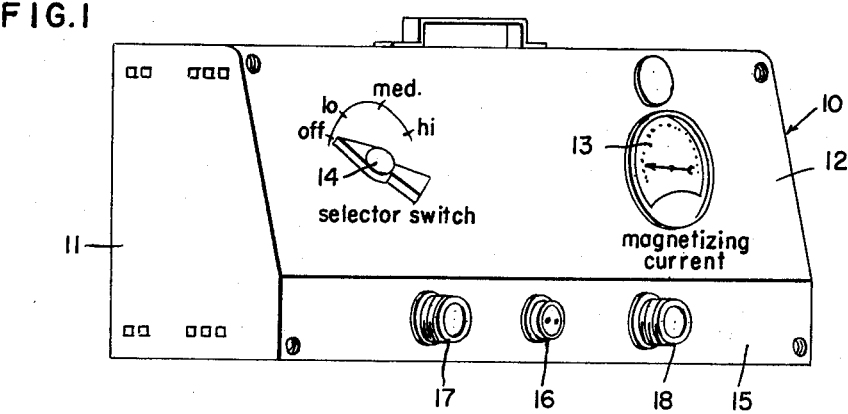
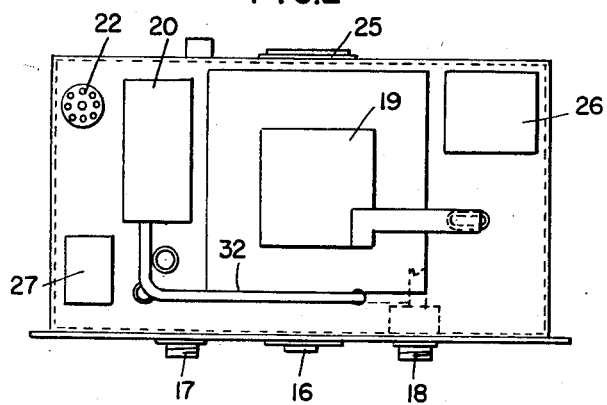
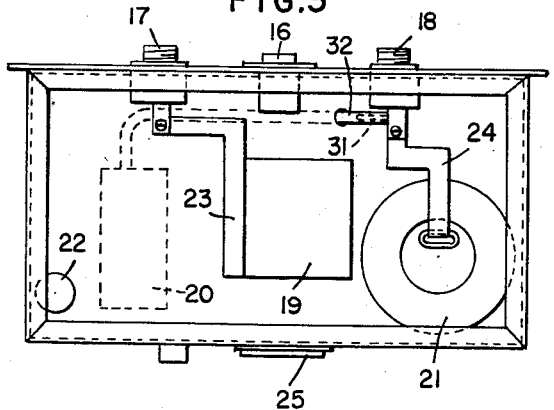
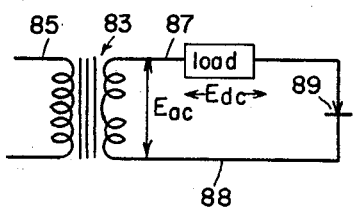
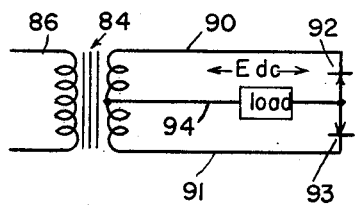
INVENTOR.
William Taylor
BY
*Shoemaker & Mattare*
ATTYS

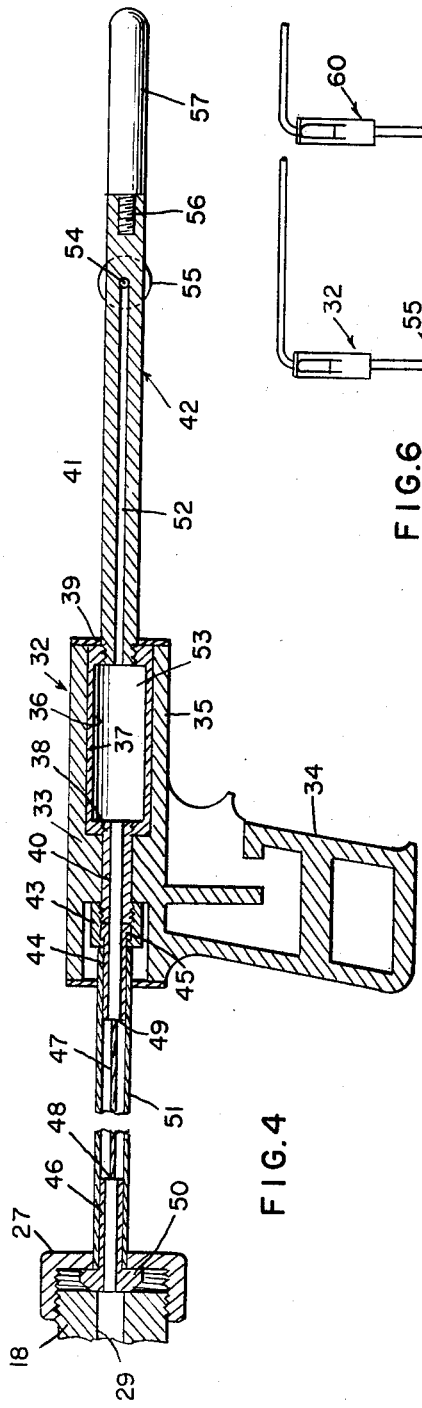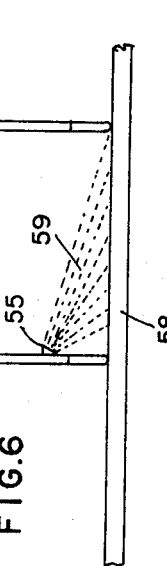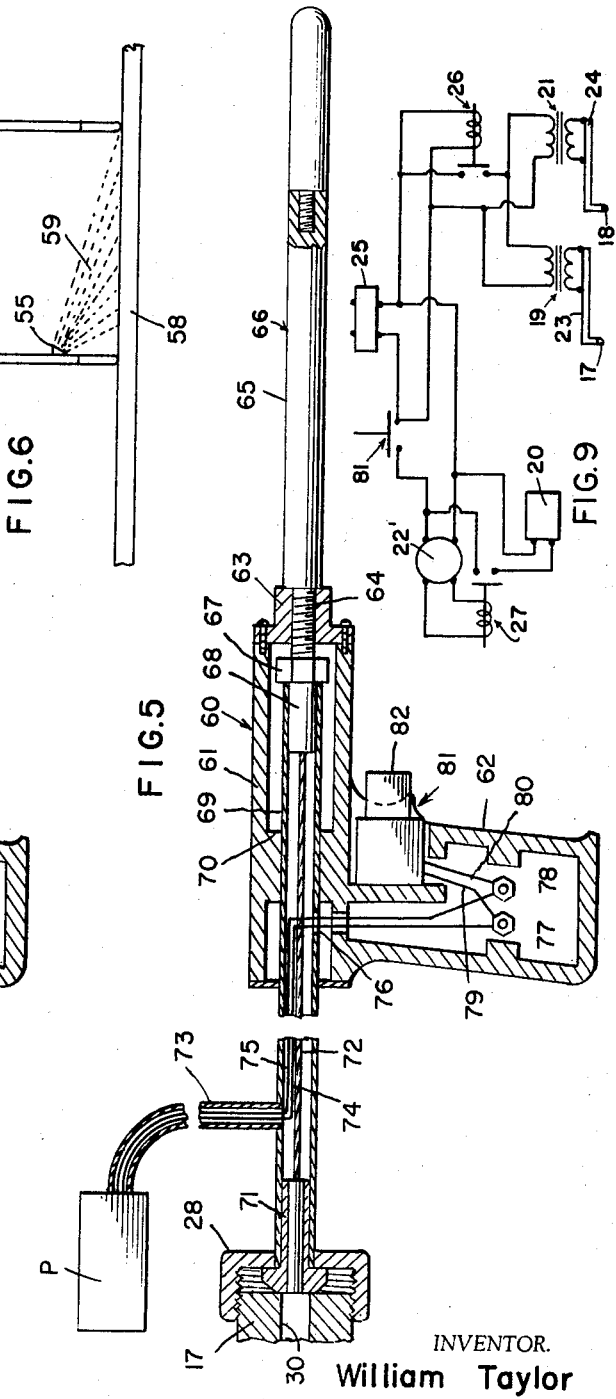

United States Patent Office 2,930,972
Patented Mar. 29, 1960

2,930,972

APPARATUS FOR DETECTING DISCONTINUITIES IN FERROUS MATERIALS

William Taylor, Norfolk, Va.

Application December 3, 1956, Serial No. 625,701

9 Claims. (Cl. 324—38)

This invention relates to apparatus for detecting discontinuities in ferrous materials and pertains more particularly to a device of this character wherein the construction inherently provides for an extremely compact and efficient apparatus.

Essentially, this invention consists of a portable carrying case embodying therein certain elements for proper operation of the device and having detachably connected thereto a pair of probe assemblies adapted to be manually operated for engaging upon the material to be tested at special points therealong and wherein one of the probes employs a magnetizable powder discharge orifice for directing a dispensed quantity of magnetizable powder over the surface of the material being tested between the probes and wherein means is provided for selectively energizing the probes to produce a magnetic effect in the material being tested between the probes.

Another object of this invention is to provide an assembly of the character described wherein the probe assemblies include flexible conduit means detachably connected at one end to the main body of the machine and carrying at their other ends the probes and with at least one of such conduit means being adapted to convey powdered magnetizable material therethrough to its associated probe and to also carry an electrical conductor for energizing the probe whereby the conduit serves the dual purpose of providing a passageway for conducting the magnetizable material and for protecting and enclosing the electrical conductor.

It is a further object of this invention to provide a portable carrying unit embodying the essential elements of the device arranged and constructed in a novel manner whereby at least one of the electrical terminal members embodied therein serves the dual purpose of providing an electrical connection and for channeling dispensed magnetizable powder in the proper direction for communication with an associated probe assembly.

Another object of this invention is to provide a novel probe assembly embodying a carriage or casing within which is disposed a reservoir for magnetizable material which also serves as part of the electrical connection between an associated probe attached thereto and the source of electrical energy.

Still another object of this invention is to provide a novel probe assembly characterized by its extreme simplicity of construction wherein a part thereof which serves to establish a continuity of electrical connection therethrough also serves to hold the component elements in place.

Still another object of this invention is to provide a portable carrying case assembly employing and mounting a transformer, a pump means and a control mechanism with both the pump means and one side of the transformer both being connected to a common electrical terminal means for detachable connection to an associated probe assembly and serving to convey both electrical energy and magnetizable powdered material from such terminal to the associated probe assembly.

Still another object of this invention is to provide an assembly of the character described embodying means for converting alternating current into pulsating D.C. current.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a perspective view of the portable carrying case and illustrating the relative disposition of external parts thereof;

Fig. 2 is a top plan view of the assembly shown in Fig. 1 but with the cover portion thereof removed;

Fig. 3 is a bottom plan view of the assembly shown in Fig. 1;

Fig. 4 is a sectional view illustrating one of the probe elements utilized with the carrying case of Fig. 1;

Fig. 5 is a view similar to Fig. 4 but showing the other probe assembly utilized with the carrying case of Fig. 1; and Fig. 6 illustrates the manner in which the device is used and shows the probe assemblies engaged upon a portion of material to be tested and illustrating the manner in which the powdered magnetizable material is dispensed over the surface of the tested material between the probes;

Fig. 7 illustrates the circuitry of an accessory to be utilized with the construction shown in Figs. 1-6 for converting the normally alternating electrical output to a pulsating D.C. output;

Fig. 8 illustrates a modified circuit for an accessory of the type shown in Fig. 7; and Fig. 9 is a schematic diagram of the electrical circuit of the device.

Referring at this time more particularly to Fig. 1, the reference numeral 10 indicates the main body portion of the device which consists of a portable carrying case of suitable configuration as to house the various component parts thereof as will be described hereinafter and which, in the specific assembly shown, includes opposite side walls 11 and a removable front panel assembly 12 housing an ammeter and a selector switch 14. Also projecting through the lower portion 15 of the front panel 12 is a control circuit socket 16 and a pair of terminal members 17 and 18.

Figs. 2 and 3 illustrate the disposition of component elements disposed within the carrying case assemblage which will be seen to include the transformer 19, the pump 20 and the current transformer 21 as well as the time delay tube socket base 22 with a time delay tube 22' therein.

As seen most clearly in Fig. 9, the two terminals 17 and 18 are connected by means of bus bars 23 and 24 to the transformer members 19 and 21 and the primaries of the transformers are connectable to a source of alternating current supply by means of the socket connection 25. In this respect, it is contemplated that the device be constructed to operate on either 110 or 220 volts A.C. The primaries of the transformers 19 and 21 are not directly connected to the source of electrical energy but rather are connected thereto through the primary relay mechanism 26. There is also a secondary relay mechanism 27 which forms in cooperation with the time delay tube receivable in the socket 22 the control for the energization of the pump 20. The circuitry for the various electrical components of the carrying case assemblage is of entirely conventional nature and is such that upon closing of a control switch hereinafter disclosed, the primary relay 26 as well as the time delay tube are energized. This immediately establishes electrical connection through the transformers to the two terminals 17 and 18 and after a predetermined time delay operates to close the secondary relay 27 to energize and actuate the pump 20. Referring now more particularly to Figs. 4 and 5, it will be seen that both the terminals 17 and 18 are preferably identically formed each terminating in an externally threaded end portion for receiving the retaining nut members 28 and 28'. Additionally, each termnial is provided with a bore such as is indicated by the reference characters 29 and 30 and in the case of one of these terminals, in this example, the terminal 18, there is provided thereon a laterally projecting nipple 31 over which is slipped one end of a tube element 32 leading to the discharge of the pump 20, the purpose of which will be presently apparent. The bores 29 and 30 are blind, that is, they open only on the outer ends of the terminals 17 and 18 with their inner ends being blocked off or terminating short of the opposite ends of the terminal portions, it being understood that the nipple 31 communicates, of course, with the corresponding bore 29 in the terminal 18.

As shown most clearly in Fig. 4, one of the probe assemblies 32 consists essentially of a carriage or casing 33 which may conveniently be in the shape of a pistol for ease and manipulation and including the hand grip portion 34 and the main body portion 35, both of which may be made hollow in the interest of light weight and economy of constructioin. Removably received within a hollow chamber portion 36 of the carriage is a hollow reservoir member 37 having opposite end walls 38 and 39 which are provided with internally threaded openings to receive respectively the connector sleeve 40 and the base 41 of the electrode or probe indicated generally by the reference character 42.

The sleeve 40 is hollow and is threaded externally at its opposite ends and on its rearward end removably receives a nut member 43 which serves to retain the reservoir element 37 in place and at the same time establish electrical connection between the sleeve 40 and a spud member 44, the spud being provided with an enlarged inner end portion 45 retained between the end of the sleeve 40 and the nut 43 as is clearly shown. The spud 44 is electrically connected to a similar spud 46 by means of a length of wire 47 or the like, the conductor 47 being soldered or otherwise suitably secured to the two spuds as is indicated by the reference characters 48 and 49. The spud 46 is provided with an enlarged free end portion 50 seated between the previously mentioned nut 27 and the associated terminal 18 and the spuds both serve as nipple members for receiving the opposite ends of a flexible conduit member 51 which interconnects the two spuds in the manner shown and completely encases the conductor 47 and effectively insulates it.

The electrode or probe 42 consists of the previously mentioned base portion 41 which is provided with a bore 52 opening into the reservoir chamber 53 and extends substantially the full extent of the base to terminate in a laterally directed discharge port 54 which may or may not have associated therewith a diffusing nozzle 55 for the purpose of which will be presently apparent. The outer free end of the base 41 is drilled and tapped to receive the threaded stud portion 56 of the replaceable probe contact element 57 which is adapted to seat directly upon the material being tested.

In practice, the reservoir chamber 53 is filled with magnetizable powder and the pump 20 is of the type which when actuated will pump a predetermined quantity of air through the line 32, the bore 29 of the terminal 18, the flexible conduit 51, the sleeve 40 and into the reservoir chamber 53 to force therefrom a predetermined quantity of magnetizable material which is expelled from the proble assembly through the discharge port 54 and the diffusing nozzle head 55 to be sprayed evenly over the surface of the material being tested as is illustrated most clearly in Fig. 6. In this figure, the material being tested is indicated by the reference character 58 and the probe assembly 32 will be seen to be dispensing the magnetizable material as is indicated by the reference character 59 over the area of the material 58 between the probe assemblies 32 and 60, the latter being shown in deail in Fig. 5.

The other probe assembly shown in Fig. 5 and illustrated by the reference character 60 will be seen to consist essentially of a main body portion 61 and handle grip portion 62 formed quite similarly to the construction embodied in Fig. 4. However, in this case the free end of the main body portion 61 is provided with a removable collar member 63 which is provided with an internally threaded bore receiving the stud end portion 64 of the base 65 of the electrode assembly indicated generally by the reference character 66. Threaded over the inner free end of the stud portion 64 is a retaining nut 67 serving to hold the spud 68 thereon. One end of the flexible conduit 69 is slipped over the spud 68 and extends therefrom through the intermediate body portion 70 of the carriage and out through the rear face thereof to terminate and engage over the spud 71 which is formed identically with the previously mentioned spud 50 and is mounted and engaged against its corresponding terminal 17 in an identical manner as is disclosed in Fig. 4. The spuds 68 and 71 are electrically interconnected by means of the conductor 72 which is wholly encased within the flexible conduit 69 and is insulated and isolated thereby. Joining the flexible conduit 69 closely adjacent the end portion thereof which is slipped over the spud 71 is a second flexible conduit 73 which leads therefrom to the plug P connected to the aforementioned primary relay assemblage 26 through the plug base 16 and a pair of control conductors 74 and 75 extend from the primary relay element through the flexible conductor 73 and into the flexible conductor 69 to a point within the confines of the main body portion 61 of the probe assembly 60 and thence outwardly through an opening 76 in the wall of the conduit 69 and into the hollow pistol grip portion 62 where they are anchored to terminals 77 and 78. Two further conductors 79 and 80 extend from these two terminals 77 and 78 to a switch element indicated generally by the reference character 81 having an actuating button element 82 projecting outwardly from the hand grip portion in the fashion of a trigger so that when the forefinger is squeezed against the button 82, the switch 81 will complete the circuit between the two conductors 79 and 80 and consequently energize the primary relay element 26, thus initiating the sequence of operations as outlined above. That is, depression of the switch button 82 will immediately energize the two probes and, consequently, the material being tested is magnetized in the region between the probes and after a predetermined period of time, the time delay tube will actuate the second relay to energize and actuate the pump 20 to dispense a predetermined quantity of magnetizable powder from the probe assembly 32 and over the surface area of the material being tested between the electrode so that the pattern of the magnetizable powder as collected upon the surface of the material may be studied to determine and detect discontinuities either in the surface of the material or in the subsurface portions thereof.

It is to be noted that the terminals 17 and 18 operate in conjunction with their associated spuds to convey the electrical energy to the probes and that the component portions of the assembly 32 which serve as a passageway for transmitting pressure impulses from the pump 20 to the reservoir chamber 53 serve also to electrically connect the terminal 18 to the electrode assembly 42. In this respect, it is to be noted that the pump 20 need not necessarily supply only pressure impulses to the reservoir but in some cases it may be desirable or practical to actually pump the magnetizable material by discharging it from the pump, in which case a suitable reservoir of such powder will be contained within the carrying case assemblage 10.

Figs. 7 and 8 illustrate the circuitry for accessories which may be utilized in connection with the herein described invention for the purpose of supplying D.C. current to the probe electrodes. Each such accessory will be seen to consist of a transformer indicated by the reference characters 83 and 84. The primary sides 85 and 86 of these transformers would be connected directly to the terminals 17 and 18 whereas the secondary conductors 87 and 88 in the case of Fig. 7 would be connected to the probe electrodes with a rectifier 89 being utilized in one of such lines to rectify the current to pulsating D.C.

In the case of the assembly shown in Fig. 8, both secondary conductors 90 and 91 would be connected through rectifiers 92 and 93 to one of the probe electrodes whereas the center tab 94 would be connected directly to the other electrode so that a full wave rectification of the current would be accomplished. In the case of both Fig. 7 and Fig. 8, the load indicated therein represents the circuit through the material being tested between the electrodes.

I claim:

1. Apparatus for detecting discontinuities in ferrous metals comprising a portable container, a transformer mounted in said container adapted for connection to a current supply, a pair of electrical terminal elements mounted in said container and connected to the output of said transformer, a pair of probe assemblies detachably secured to said terminals for engagement at spaced points along the surface of material to be tested for energizing the material between such points of contact, one of said terminals having a bore therethrough and the probe assembly associated therewith being connected to such terminal through a hollow flexible element so that the terminal bore is in communication with said probe assembly, means in said container for expelling magnetizable powder through said terminal bore, and said probe assembly having a discharge orifice communicating with said flexible element for dispensing magnetizable powder over the material between said probe assemblies.

2. Apparatus for detecting discontinuities in ferrous materials, comprising a portable mounting base assembly having a transformer, pump means and control mechanism secured thereto, said base assembly also having a pair of terminals mounted thereon, said transformer being connectable to a source of electrical energy and having electrical connection on its outlet side to said terminals through said control mechanism, said pump means also being connectable to a source of electrical energy through said control mechanism so that the latter, when actuated, energizes said terminals and said pump means, a pair of manually operated probes adapted to be engaged against a ferrous member for testing the mass thereof between the probes, a flexible conduit extending between each probe and one of said terminals, an electrical conductor extending through each conduit between the terminal and associated probe to electrically connect the same, one of said terminals having a bore communicating with the associated conduit and the corresponding probe having a discharge orifice communicating with the other end of such conduit, said pump means having a discharge outlet communicating with said terminal bore to dispense magnetizable powder from said discharge orifice in the one probe and spread such powder over the surface of the material being tested between the probes, and means for selectively actuating said control mechanism.

3. In the apparatus as defined in and by claim 2 wherein said control mechanism includes a time delay device for energizing said pump means subsequent to initiation of the energization of said terminals.

4. Apparatus for detecting discontinuities in ferrous material comprising a housing containing a transformer, a primary relay for energizing said transformer, a fluid pump, and a secondary relay for energizing said pump, a pair of terminals fixed to said housing and electrically connected to the output of said transformer, one of said terminals having a recess therein in communication with the discharge of said pump, a flexible tube fixed at one end to said one terminal in communication with said recess therein, a probe fixed to the other end of said tube and having a passageway therein communicating with the tube and terminating in a discharge orifice for discharging magnetizable powder in the region of said probe upon actuation of said pump, a second probe electrically connected to the other terminal, and control means carried by one of said probes for actuating the primary and secondary relays to effect a flow of current within ferrous material between points thereon engaged by said probes and to actuate said pump.

5. In the apparatus as defined in and by claim 4 wherein said housing also contains a time delay mechanism connected to said secondary relay to delay actuation of said pump until after said probes have been energized.

6. In an apparatus as defined in and by claim 1 including a current rectifying means connected between said terminals and said probes for conducting pulsating D.C. current to said probes.

7. In an apparatus as defined in and by claim 2 including a current rectifying means connected between said terminals and said probes for conducting pulsating D.C. current to said probes.

8. Apparatus for detecting discontinuities in ferrous materials comprising a source of current, a pair of probe members, means for selectively connecting said probe members to said supply of current for producing a magnetic field within ferrous material in the area thereof between points of contact with said probes, means for dispensing magnetizable material from one of said probes, and said means for electrically connecting said probes to the current source being also effective to connect said means for dispensing magnetizable material to said source of current, said means for dispensing magnetizable material including a time delay mechanism so that the dispensing operation lags the production of the magnetic field between said probe members.

9. An apparatus defined in and by claim 8 wherein said means for dispensing magnetizable material comprises a fluid pump, said time delay mechanism being connected between the current source and said pump such that the probes will be energized first and then the pump will be actuated to dispense the magnetizable material.

References Cited in the file of this patent

UNITED STATES PATENTS

| | | |
|---|---|---|
| 1,553,543 | Lincoln | Sept. 15, 1925 |
| 1,687,081 | Chapman | Oct. 9, 1928 |
| 2,334,827 | Lyons | Nov. 23, 1943 |
| 2,430,167 | Fitch | Nov. 4, 1947 |
| 2,432,786 | Newman | Dec. 16, 1947 |
| 2,436,918 | De Forest | Mar. 2, 1948 |
| 2,644,921 | Lewkowski | July 7, 1953 |